May 1, 1934.  E. H. REID  1,957,226
ELECTRIC REGULATING SYSTEM
Filed March 9, 1932
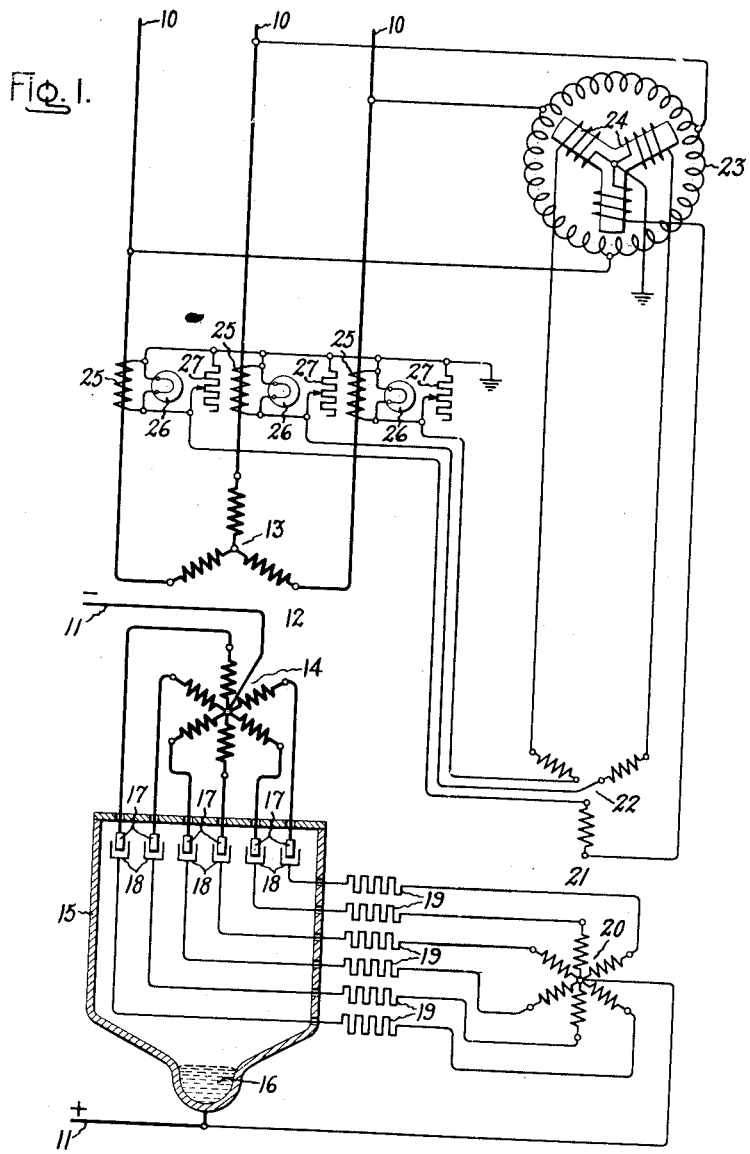
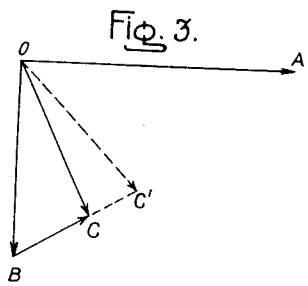
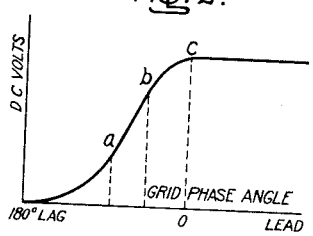
Inventor:
Eugene H. Reid,
by Charles V. Allen
His Attorney.

Patented May 1, 1934

1,957,226

UNITED STATES PATENT OFFICE 1,957,226

ELECTRIC REGULATING SYSTEM

Eugene H. Reid, Schenectady, N. Y., assignor to General Electric Company, a corporation of New York Application March 9, 1932, Serial No. 597,758

5 Claims. (Cl. 175—363)

My invention relates to electric regulating systems and more particularly to such systems including electric valves for regulating the energy transmitted between direct and alternating current circuits.

Heretofore, there have been proposed various arrangements including an electric valve for transmitting energy between direct and alternating current circuits in which an electrical condition of one of the circuits is controlled or regulated in response to predetermined circuit conditions. It has been found that such regulation may be simply and satisfactorily effected by applying to the grid of the electric valve an alternating potential variable in phase with respect to its anode potential. If the phase of the grid potential is made to vary linearly with respect to the electrical condition to be controlled, however, it has been discovered that a non-linear regulation characteristic will be secured, since equal variations in phase of the grid potential produce unequal variations in the average current transmitted by the valves for different portions of the positive half cycle of anode potential of the electric valve during which such phase control is effective.

It is an object of my invention, therefore, to provide an improved electric regulating system including an electric valve which will overcome the above mentioned disadvantages of the arrangements of the prior art and which will be simple and reliable in operation.

It is another object of my invention to provide an improved electric regulating system including an electric valve, in which a substantially linear regulation characteristic of any desired electrical condition of the system may be obtained.

It is a further object of my invention to provide an improved electric valve rectifying system including a regulating means for the rectifier by means of which a substantially flat or over-compounded volt-ampere characteristic may be obtained on the direct current circuit.

In accordance with my invention, direct and alternating current circuits are interconnected through an electric valve provided with a grid for controlling the current transmitted therethrough. There is provided a control circuit for the grid including an alternating potential derived from the alternating current circuit and variable in phase with respect thereto, to control the energy transmitted between the power circuits. There is also included in the control circuit a potential derived from and variable in accordance with the current transmitted between the apparatus, which cooperates with the first potential to secure a predetermined volt-ampere characteristic of one of the power circuits. In order to effect a linear volt-ampere regulation characteristic, a non-linear impedance is connected in circuit with the current responsive means and so modifies the potential derived therefrom as to compensate for the tendency of the variable phase grid potential to effect a non-linear regulation characteristic. By the term non-linear impedance is meant an impedance having a non-linear volt-ampere characteristic. In certain cases an additional manually variable resistor may be connected in shunt to the current responsive means in order to obtain various predetermined regulation characteristics.

For a better understanding of my invention, together with other and further objects thereof, reference is had to the following description taken in connection with the accompanying drawing, and its scope will be pointed out in the appended claims. Fig. 1 of the accompanying drawing illustrates an arrangement embodying my invention for transmitting energy between a three-phase alternating current circuit and a direct current circuit, while Figs. 2 and 3 are diagrams to aid in the understanding of my invention.

Referring now to the drawing, there is illustrated an apparatus for transmitting energy between a three-phase alternating current circuit 10 and a direct current circuit 11. This apparatus comprises a transformer 12 consisting of a three-phase primary winding 13 connected to the circuit 10 and a six-phase secondary winding 14, and an electric valve 15 which may be of any of the several types well known in the art, although I have illustrated by way of example, a mercury arc rectifier provided with a mercury pool cathode 16, a plurality of anodes 17 and associated control grids 18. The rectifier 15 and the polyphase winding 14 are connected in the conventional manner to secure half wave rectification; that is, the negative side of the direct current circuit 11 is connected to the neutral of the winding 14, while the positive side of the direct current circuit is connected to the cathode 16, and the several phase terminals of the winding 14 are connected to the several anodes 17 of the rectifier 15. In order to control the amount of energy transmitted between the power circuits 10 and 11, the several grids 18 are connected through current limiting resistors 19 to the several phases of a six-phase secondary winding 20 of a grid transformer 21 provided with a three phase primary winding 22 which is energized from the alternating current circuit 10 through any suitable phase shifting arrangement, such for example, as a rotary phase shifting transformer 23, the winding 22 being connected to the three-phase secondary member 24 thereof. Each of the several phases of the primary winding 22 also receives a component of potential from one of the series transformers 25 connected in the several phases of the alternating current circuit 10, and, in order to modify the potential derived from the series transformers there is connected in shunt to each a non-linear impedance element 26, which may be of any of the several types well known in the art, although I have shown by way of example a non-linear resistance of the type comprising an incandescent filament in an evacuated chamber. In certain cases it may be desirable, also, to connect manually variable resistors 27 in shunt to each of the series transformers in order that various predetermined regulation characteristics of the direct current circuit may be obtained. If desired, the common connection of the current transformers 25 and the neutral of secondary winding 24 of the rotary phase shifting transformer 23 may be grounded in order to provide a closed neutral for the three-phase grid excitation circuit.

The general principles of operation of the above described apparatus in which the average voltage of the direct current circuit 11 is regulated by applying to the grids of the valve 15 an alternating potential variable in phase with respect to the anode potential thereof, will be well understood by those skilled in the art, or may be found explained in detail in United States Letters Patent No. 1,654,949 granted January 3, 1928, upon the application of T. M. G. Toulon. In brief, each of the anodes will be rendered conductive at points in its respective positive half cycles of anode potential when its associated grid also becomes positive. By varying the phase of the grid potential, that is, the point in the cycle at which the grid becomes positive, the average voltage impressed upon the direct current circuit 11 may be varied. The D. C. voltage grid phase angle characteristic of such an apparatus is illustrated in Fig. 2. The normal range of regulation is illustrated by the portion ac of this curve. It is seen that the portion ab of this curve is substantially linear; that is, equal variations in the grid phase angle produce equal variations in the voltage of the direct current circuit, but that the portion bc of this curve is decidedly non-linear; that is, equal variations in the grid phase angle do not produce equal variations in the voltage of the direct current circuit. The manner in which the grid potential of the valve 15 is varied in phase with respect to its anode potential may be understood more clearly by reference to the vector diagram of Fig. 3, in which the vector OA represents the potential applied to one of the anodes of the valve 15, the vector OB the potential applied to the associated grid from the grid transformer 21 and rotary phase shifting transformer 23, and the vector BC the potential derived from the associated series transformer 25. The secondary member 24 of the phase shifting transformer 23 may be so adjusted as to give the proper voltage on the direct current circuit under no load condition, or under very light load condition. As the current transmitted by the apparatus increases, the voltage on the direct current circuit tends to drop due to the impedance drop in the apparatus. However, as the current increases, the vector BC increases correspondingly and thus advances the phase of the grid potential OC to raise the effective voltage of the rectifier 15 and thus compensate for the impedance drop. Obviously, if the current increases to a value corresponding to the vector BC' derived from the series transformer the grid potential will be advanced in phase still further to maintain a substantially constant voltage on the direct current circuit. However, as explained above, when the grid phase angle comes within the operating range BC the average voltage will not be raised proportionately to the increase in current unless there is provided some means for advancing the grid phase angle by a large increment for each increment increase in current. Such a result is accomplished by the non-linear resistance elements 26, the resistance of which increases rapidly with an increase in applied voltage from the series transformers 25 under heavy load conditions. Obviously, with an increase in the resistance of the elements 26, less of the current of the transformers 25 is by-passed therethrough, and the effective voltage is increased more than proportionately to the load current. By means of the manually variable resistors 27 the ratio of the grid phase angle to the variations in load current may be adjusted to give any desired regulation characteristic.

While I have described my invention as applied to an arrangement for transmitting energy from a three-phase alternating current circuit to a direct current circuit, it will be apparent to those skilled in the art that my invention is equally applicable to an alternating current circuit of any number of phases, and to the transmission of energy in the reverse direction; that it, from the direct current circuit to the alternating current circuit.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The combination of alternating and direct current power circuits, means for transmitting energy therebetween including an electric valve provided with an anode, a cathode, and a control grid, a control circuit for applying a potential to said grid to determine the energy transmitted through said valve, means responsive to the current transmitted between said power circuits for modifying said potential to regulate the volt-ampere characteristic of one of said circuits, said volt-ampere regulation characteristic tending to be substantially non-linear, and means cooperating with said current responsive means for further modifying said potential to effect a substantially linear regulation characteristic.

2. The combination of alternating and direct current power circuits, means for transmitting energy therebetween including an electric valve provided with an anode, a cathode, and a control grid, a control circuit for applying a potential to said grid, means responsive to the current transmitted between said power circuits for modifying said potential, and a non-linear impedance element in circuit with said potential modifying means for further modifying said potential.

3. The combination of alternating and direct current power circuits, means for transmitting energy therebetween including an electric valve provided with an anode, a cathode, and a control grid, a control circuit for said grid including a source of alternating potential variable in phase and a second source of alternating potential substantially fixed in phase but variable in magnitude in accordance with current transmitted between said power circuits, and a non-linear impedance connected in circuit with said second source of potential for modifying its variations in magnitude to modify the volt-ampere regulation characteristic of one of said power circuits.

4. The combination of alternating and direct current power circuits, means for transmitting energy therebetween including an electric valve provided with an anode, a cathode, and a control grid, a control circuit for said grid including a phase shifting circuit energized from said alternating current circuit and current responsive means for producing a potential variable in accordance with the current transmitted between said power circuits, and a non-linear impedance connected in parallel to said current responsive means.

5. A rectifier regulating system comprising direct and alternating current circuits, a grid controlled rectifier for transmitting energy therebetween, a grid control circuit for said rectifier including a phase shifting circuit energized from said alternating current circuit and a series transformer connected in said alternating current circuit, a non-linear resistance connected in shunt to said series transformer, and a manually variable resistor also connected in shunt to said transformer.

EUGENE H. REID.